United States Patent
Ramamurthy (10) Patent No.: US 11,347,893 B2
(45) Date of Patent: *May 31, 2022

(54) METHODOLOGY TO PREVENT SCREEN CAPTURE OF SENSITIVE DATA IN MOBILE APPS

(71) Applicant: Visa International Service Association, San Francisco, CA (US)

(72) Inventor: Rakesh Ramamurthy, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/270,154

(22) PCT Filed: Aug. 28, 2018

(86) PCT No.: PCT/US2018/048274
§ 371 (c)(1),
(2) Date: Feb. 22, 2021

(87) PCT Pub. No.: WO2020/046274
PCT Pub. Date: Mar. 5, 2020

(65) Prior Publication Data
US 2021/0200886 A1    Jul. 1, 2021

(51) Int. Cl.
*G06F 3/048*       (2013.01)
*G06F 21/62*       (2013.01)
(Continued)

(52) U.S. Cl.
CPC ........ *G06F 21/629* (2013.01); *G06F 3/04883* (2013.01); *G06F 21/6245* (2013.01);
(Continued)

(58) Field of Classification Search
CPC ............ G06F 3/04883; G06F 21/6245; G06F 2221/032; G06F 2221/2125; F06F 21/629; F06F 21/84
See application file for complete search history.

(56) References Cited

U.S. PATENT DOCUMENTS 9,977,909 B1 *   5/2018  Austin ................ G06F 3/04883
10,025,952 B1 *  7/2018  Wang .................. G06F 21/6245
(Continued)

FOREIGN PATENT DOCUMENTS

KR        101172877      8/2012
KR        101489152      2/2015

OTHER PUBLICATIONS

Li et al., Blur vs. Block: Investgating the Effectiveness of Privacy-Wnhancing Obfuscatuib for Images; © 2017; IEEE; 9 pages.*
(Continued)

*Primary Examiner* — Linh K Pham
(74) *Attorney, Agent, or Firm* — Kilpatrick Townsend & Stockton LLP (57) ABSTRACT

Described herein are a system and methods for obfuscating sensitive data during a data capture event in order to prevent unauthorized reproduction of that sensitive data. In some embodiments, an event listener detects an event likely to result in a data capture and notifies an obfuscation module. The obfuscation module then identifies sensitive data fields, determines an appropriate obfuscation technique for each data field, and obfuscates the identified data fields for the duration of the event. In some embodiments, any active data input actions may be canceled. In some embodiments, the data values within the obfuscated data fields may be revealed upon completion of the event.

20 Claims, 7 Drawing Sheets

(51) Int. Cl.
*G06F 3/04883* (2022.01)
*G06F 21/84* (2013.01)

(52) U.S. Cl.
CPC ........ *G06F 21/84* (2013.01); *G06F 2221/032* (2013.01); *G06F 2221/2125* (2013.01)

(56) References Cited

U.S. PATENT DOCUMENTS

| | | | |
|---|---|---|---|
| 10,043,033 B1* | 8/2018 | Hadsall | G06F 21/604 |
| 10,382,620 B1* | 8/2019 | Allen | G06F 21/602 |
| 10,482,284 B1* | 11/2019 | Tang | G06V 10/758 |
| 10,542,423 B1* | 1/2020 | Chang | H04W 12/02 |
| 2005/0265548 A1* | 12/2005 | Tsuchimura | G11B 7/24085 |
| | | | 380/201 |
| 2006/0089857 A1* | 4/2006 | Zimmerman | G16Z 99/00 |
| | | | 705/2 |
| 2006/0090210 A1* | 4/2006 | Bauchot | G06F 21/84 |
| | | | 726/26 |
| 2012/0036452 A1* | 2/2012 | Coleman | G06F 21/55 |
| | | | 715/751 |
| 2012/0192248 A1 | 7/2012 | Kocjan et al. | |
| 2016/0301641 A1 | 10/2016 | Belliston | |
| 2017/0068829 A1 | 3/2017 | Shaw et al. | |
| 2018/0285591 A1* | 10/2018 | Thayer | G06F 21/6245 |
| 2019/0050600 A1* | 2/2019 | Sahoo | G06F 21/32 |

OTHER PUBLICATIONS

Piec et al., Real-time screen watermarking using oberlaying layer; © 2014; IEEE; 10 pages.*
Application No. PCT/US2018/048274, International Search Report and Written Opinion, dated May 28, 2019, 12 pages.

* cited by examiner

METHODOLOGY TO PREVENT SCREEN CAPTURE OF SENSITIVE DATA IN MOBILE APPS

CROSS-REFERENCE TO RELATED APPLICATIONS

This application is a National Stage of International Application No. PCT/US2018/048274 filed Aug. 28, 2018, of which is herein incorporated by in its entirety.

BACKGROUND

As an increasing number of people have begun using mobile devices to accept payments (mPOS), the number of security concerns associated with those payments is also increasing. One of the most common security concerns is the use of a Screen Capture (or other data capture) of an mPOS application which may contain sensitive data. For example, an mPOS application may include a credit card number, expiry date, signature, etc. Mobile device platforms (like iOS) have enabled users of the mobile device to perform functionalities which a developer cannot prevent. For example, developers of mPOS applications are unable to prevent users from taking a Screen Capture of the mPOS application that includes sensitive information using conventional software development kit (SDK) application programmer interfaces (APIs).

Embodiments of the present disclosure address these problems and other problems, individually and collectively.

SUMMARY

One embodiment of the disclosure is directed to a method of obfuscating sensitive information comprising receiving, at a mobile application executed on a mobile device, an indication of an event occurring on the mobile device, determining, by the mobile application, that the event will result in a screen capture being performed with respect to the mobile application, identifying, by the mobile application, a number of data fields associated with the mobile application which are populated with sensitive information and displayed on a display of the mobile device, and causing the data fields populated with sensitive information to be obfuscated at least until the screen capture has been completed.

Another embodiment of the disclosure is directed to a mobile device comprising: a display; a processor; and a memory including instructions that, when executed with the processor, cause the mobile device to, at least: receive an indication of an event occurring on the mobile device, determine that the event will result in a screen capture being performed with respect to information presented on the display of the mobile device, identify a number of data fields associated with the information presented on the display of the mobile device which are populated with sensitive information, and cause the data fields populated with sensitive information to be obfuscated at least until the event has been completed.

BRIEF DESCRIPTION OF THE DRAWINGS

Various embodiments in accordance with the present disclosure will be described with reference to the drawings, in which.

DETAILED DESCRIPTION

Described herein are techniques for obfuscating sensitive data during a data capture event in order to prevent unauthorized reproduction of that sensitive data. In some embodiments, the system described herein includes an event listener configured to detect events and determine whether the detected events are likely to result in a data capture. The system described herein may also include an obfuscation module and the event listener may be further configured to notify the obfuscation module of any detected data capture events. The obfuscation module may then identify any relevant sensitive data fields, determine an appropriate obfuscation technique for each of the identified data fields, and obfuscate the identified data fields for the duration of the event. In some embodiments, the obfuscation module may cause any active data input actions (e.g., touch actions) to be canceled, which may result in nullification of user input. In some embodiments, the obfuscation module may be configured to reveal (unobfuscate) data values within the obfuscated data fields upon receiving an indication that the event has been completed.

Prior to discussing specific embodiments of the invention, some terms may be described in detail.

A "computing device" may include any suitable device that can electronically process data. Examples of computing devices include desktop computers, mobile devices or mobile computing devices, television sets, etc.

A "data capture event" is any event that may result in a record of data created. For example, a screen capture event may be a type of data capture event in which a screenshot is taken of a current view of a mobile application's graphical user interface. In a screen capture event, the screenshot may be stored in memory and accessed later in order to obtain data values depicted within the screenshot. Data capture events may be initiated through a number of means. For example, a user may take a screenshot using a button, a gesture, or any other suitable mechanism.

A "data field" may be any place in which data can be stored. A data field may refer to a column in a database, a field in a data entry form or a web form, or a field in a mobile application which stores a data value. The data field may contain data to be entered by a user as well as data to be displayed. In some embodiments, a data field may be associated with a particular display location. For example, a data field may be associated with a particular location within a graphical user interface (GUI) such that a value associated with the data field is displayed within that particular location. A sensitive data field may be any data field which stores information that is considered sensitive. In some non-limiting examples, data fields may include Image views, Buttons, Text Fields, or any other suitable data storage/presentation mechanism.

An "event" may be any action or occurrence. In some embodiments, an event may be an action or occurrence recognized by software, often originating asynchronously from an environment external to the software, that may be handled by the software. A number of different types of events may be recognized by a particular device. By way of illustration, a "touch event" may be any event that represents one or more points of contact with a touch-sensitive surface, and changes of those points with respect to the surface and any elements displayed upon it (e.g. for touch screens) or associated with it (e.g. for drawing tablets without displays). Touch events may also include stylus-based events performed on pen-tablet devices, such as drawing tablets. In another example, a keystroke entered by a user into a keyboard may trigger a keystroke event. In another example, a gesture performed on a mobile device may trigger a gesture recognizer (or gesture input) event.

An "event listener" is a procedure or function in a computer program that waits for an event to occur (e.g., a user clicking or moving the mouse, pressing a key on the keyboard, or an internal timer or interrupt). In some embodiments, the event listener may be a loop that is programmed to react to an input or signal. Event listeners may be configured to listen for a particular type of event. For example, an event listener may be configured to detect a screen capture event by detecting that a screen capture button has been pressed by a user. In some embodiments, an event listener may detect events based on data received from an operating system.

A "mobile device" may include any portable electronic device capable of performing at least a portion of the functionality described herein. A mobile device may include at least a processor, a memory, and a display device capable of displaying information to a user. In some embodiments, a mobile device may be capable of communication with a number of other electronic devices. Mobile applications may be installed upon, and executed from the memory of, the mobile device to cause the mobile device to perform a number of functions. Some illustrative examples of a mobile device may include a cellular phone, personal data assistant (PDA), tablet device, or any other suitable device.

An "obstruction layer" may be any virtual object used to obfuscate a piece of data. In some embodiments, an obstruction layer may comprise one or more opaque areas to be displayed upon a display screen over the sensitive data. In some embodiments, an obstruction layer may be generated by identifying the location, size, and shape of sensitive data and generating a blocking object of the determined size and shape at the determined location.

An "operating system" may include any software that supports a computers basic functions, such as scheduling tasks, executing mobile applications, and controlling peripherals.

The term "sensitive information" may refer to any information that should be protected against unwarranted disclosure. Protection of sensitive information may be required for legal or ethical reasons, for issues pertaining to personal privacy, or for proprietary considerations.

A "user" may include an individual. In some embodiments, a user may be associated with one or more personal accounts and/or mobile devices. The user may also be referred to as a cardholder, account holder, or consumer.

Techniques described herein are directed to a system which prevents users from taking a screen capture of sensitive data depicted within a software application by continuously monitoring the events provided platform and gesture recognizers, and masking or overlaying an additional layer of obstruction upon detecting initiation of a screen capture event. Thus, the system ensures that the sensitive information in the software application is not depicted in any captured screenshots. When the system detects an initiation attempt of a screen capture and in some cases, a long press gesture recognizer may take place. This attempt causes all the ongoing touch/keystroke event cycle to be ended (i.e. canceled) by the operating system and thus population of all sensitive data fields get canceled. By continuously listening to these events and gesture recognizers, embodiments of the invention can draw an obstruction layer to mask or hide the sensitive data. In some embodiments, this is achieved by providing custom code to the user interface (UI) containers that are used to show the sensitive information (e.g., Image views, Buttons, Text Fields, Views, etc.) provided by platforms and listening to the Touch and Gesture recognizer events. For example, if a user is presented with a View to get the signature of a customer in a typical mPOS application, the View may be a custom View extended with the functionality described herein, which is capable of changing the sensitive information by overlaying it with an obstruction layer in order to mask or hide information.

Figure 1:
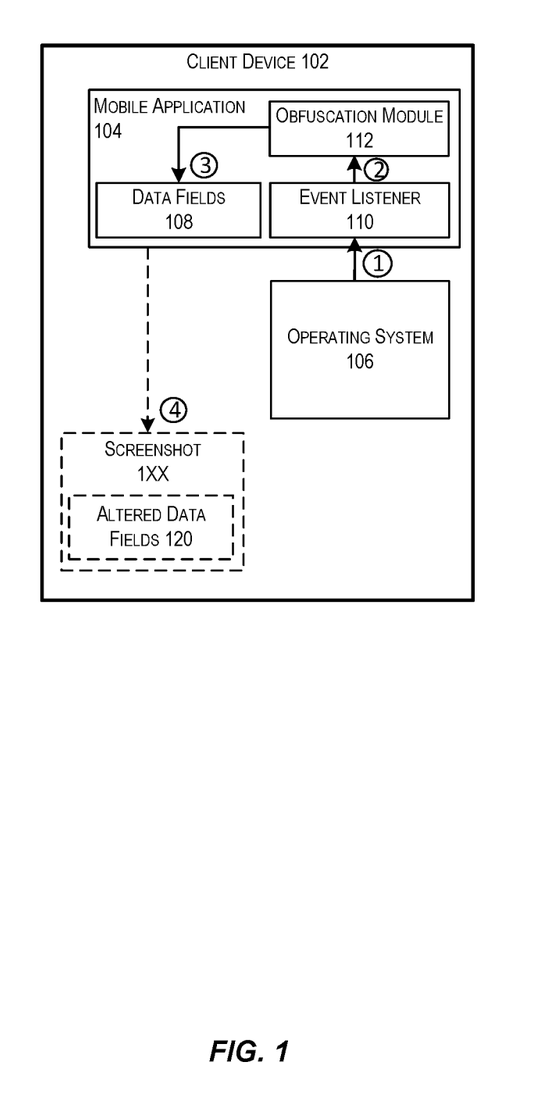
FIG. 1 depicts an illustrative example of a system that uses one or more techniques in accordance with the processes described herein.

FIG. 1 depicts an illustrative example of a system that uses one or more techniques in accordance with the processes described herein. In FIG. 1, a client device 102 is depicted as including in its memory at least one mobile application 104 and an operating system 106.

In some embodiments, the mobile application 104 may include a number of data fields 108, an event listener 110, and/or an obfuscation module 112. The data fields 108 may be in various states of data population. For example, a user may select each of the data fields (e.g., via a touch event) and may select data to populate into that data field. Each of the data fields 108 may include an indication as to whether the data populated into that data field is sensitive. For example, each data field may be associated with a metadata tag indicating a sensitivity level of the data within that data field.

The event listener 110 may be configured to listen for client device events which would indicate the initiation of a screen capture event. For example, the event listener 110 may be configured to listen for screen capture activation commands, gestures that indicate a screen capture command, and/or keystroke and button activation that are used to initiate a screen capture.

Upon detecting an event that indicates a screen capture, the event listener 110 may notify the obfuscation module 112. The obfuscation module 112 may subsequently identify each of the data fields 108 associated with a particular level of sensitivity and may initiate an obfuscation process to obfuscate the data populated into each of the data fields 108. In some embodiments, the data fields may be obfuscated by being covered by an obstruction layer. In some embodiments, the data fields may be obfuscated by emptying the data fields or nullifying the data within the field.

In some embodiments, the mobile application may be receiving information via a touch/keystroke event when the event listener detects a screen capture event. In this scenario, the obfuscation module 112 may cause each current touch/keystroke event to be ended (i.e., canceled) in order to complete the obfuscation process.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
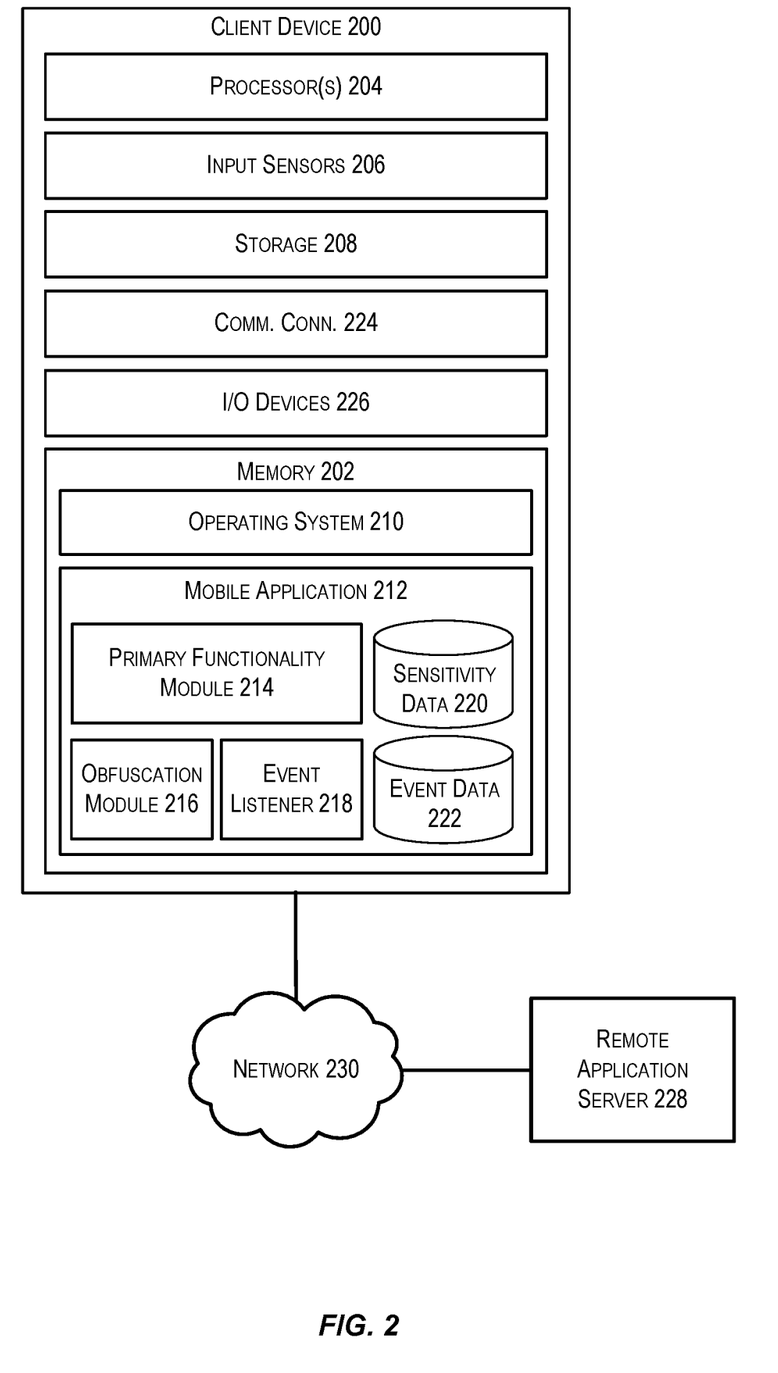
FIG. 2 depicts an illustrative example of a system or architecture in which techniques for obfuscating sensitive data to prevent screen capture may be implemented.

FIG. 2 depicts an illustrative example of a system or architecture in which techniques for obfuscating sensitive data to prevent screen capture may be implemented. In the depicted architecture, one or more consumers and/or users may utilize a client device 200, which may be an example of a client device 102 as depicted in FIG. 1. In some examples, the client device 200 may be in communication with a service provider computer which provides backend support for at least a portion of the functionality described herein.

The client device 200 may be any type of computing device such as, but not limited to, a mobile phone, a smart phone, a personal digital assistant (PDA), a laptop computer, a desktop computer, a server computer, a thin-client device, a tablet PC, etc. The client device 200 may include a memory 202 and one or more processors 204 capable of processing user input. The client device 200 may also include one or more input sensors 206 for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. In some embodiments, the input sensors 206 may include a "touch screen" display device, which may be used to convey information (e.g., a user signature) to the client device 200.

Embodiments of the application on the client device 200 may be stored and executed from its memory 202. The memory 202 may store program instructions that are loadable and executable on the processor(s) 204, as well as data generated during the execution of these programs. Depending on the configuration and type of client device 200, the memory 202 may be volatile (such as random access memory (RAM)) and/or non-volatile (such as read-only memory (ROM), flash memory, etc.). The client device 200 may also include additional storage 208, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM) or ROM. Turning to the contents of the memory 202 in more detail, the memory 202 may include an operating system 210 and one or more mobile application programs 212 or services for implementing the features disclosed herein. In some embodiments, the mobile application 212 may include a number of modules, or components, including at least a module for performing some core function of the mobile application 212 (primary functionality module 214) as well as a module for obfuscating sensitive data displayed by the mobile application 212 (obfuscation module 216) and a module for detecting a potential screen capture event (event listener 218). The memory 202 may also include information pertaining to a level of sensitivity for various data fields (sensitivity data 220) as well as information pertaining to various types of events (event data 222).

It should be noted that although depicted as being included in the mobile application 212, the obfuscation module 216 and/or the event listener 218 may be separate from the mobile application 212. For example, obfuscation module 216 and/or the event listener 218 may be included in a separate mobile application from mobile application 212. In this example, the mobile application 212 may access at least a portion of the functionality provided by the obfuscation module 216 and/or the event listener 218 via an application programming interface (API). In some embodiments, this may be accomplished via the use of method calls or other techniques. In some embodiments, an original version of the mobile application 212 may be modified to include the In some embodiments, the obfuscation module 216 may comprise code that, when executed in conjunction with the processors 204, cause the client device 200 to conceal, empty, or otherwise obfuscate data displayed with respect to certain data fields. In some embodiments, the obfuscation module 216 may identify a number of data fields for which entered values may be considered sensitive data. In some embodiments, data fields that include sensitive data may be indicated in a database table such as sensitivity data 220. The obfuscation module 216 may determine, at any given time, which of these sensitive data fields are populated with data and displayed on a display of the client device 200. In some embodiments, the obfuscation module 216 may also identify particular areas of the display in which the data resides. For example, each data field may be associated with a particular location within a GUI as well as a particular size and/or shape. In this example, the obfuscation module 216 may identify particular locations, sizes, and shapes for each data field determined to be displaying sensitive data on the display. In some embodiments, displayed sensitive data may be identified upon receiving an indication that a screen capture event has been detected. In some embodiments, displayed sensitive data may be identified independent of detecting any events and may be updated as data is moved on the display.

Upon receiving an indication that a screen capture event has been detected (e.g., via the event listener) the obfuscation module 216 may determine what type of obfuscation is appropriate for each of the data fields identified as including sensitive data that are currently displayed by the client device 200. For example, the obfuscation module 216 may determine whether it is appropriate to empty out, or nullify, a data field. In another example, the obfuscation module 216 may determine whether it is appropriate to place an obstruction layer over the data displayed in the data field. In this example, the obfuscation module 216 may generate an obstruction layer of a size and shape sufficient to conceal the sensitive data which may then be placed in the location of the sensitive data such that it is displayed over the sensitive data. In some embodiments, the obfuscation module 216 may be configured to cancel any active data input events, resulting in nullifying any data fields that are currently being entered. The obfuscation module 216 may be configured to maintain the obfuscation of the data fields until the screen capture event has concluded (e.g., as indicated by the event listener).

In some embodiments, the event listener 218 may comprise code that, when executed in conjunction with the processors 204, detect an event that is likely to result in a screen capture or similar data-capture action (i.e., a screen capture event). In some embodiments, the event listener 218 may detect all events pertaining to the client device 200 (e.g., keystroke events, touch events, button activation events, etc.) and may determine whether those detected events will result in a screen capture event. In some embodiments, a list of events which result in a screen capture event may be maintained in event data 222. In these embodiments, the event listener 218 may be configured to listen for events matching those indicated in event data 222 as resulting in a screen capture event. Upon detecting a screen capture event, the event listener 218 may report the event to the obfuscation module 216.

In some embodiments, the event listener 218 may be further configured to report the conclusion of a screen capture event to the obfuscation module 216. For example, the event listener may, upon determining that a screen capture event has ended, report the conclusion of the screen capture event to the obfuscation module 216 to cause the obfuscation module 216 to reveal any obfuscated data fields.

It should be noted that, in some embodiments, one or more of the obfuscation module 216 and/or the event listener 218 may be separate from the mobile application 212. In some embodiments, the mobile application 212 may be modified (i.e., "modded" or extended) to include one or more of the obfuscation module 216 and/or the event listener 218 after installation of the mobile application 212 onto the client device 200. In some embodiments, one or more of the obfuscation module 216 and/or the event listener 218 may be a small program which is separate from the mobile application 212 (e.g., a widget or applet) and accessed by the mobile application 212 to perform the functions described above. In some embodiments, at least a portion of the obfuscation module 216 and/or the event listener 218 may be implemented as hardware modules. For example, at least a portion of the functionality described herein may be implemented as an integrated circuit of the client device 200. By way of illustration, a portion of the functionality may be implemented via a Field Programmable Gate Array (FPGA), application-specific integrated circuit (ASIC), or any other suitable hardware module.

The memory 202 and any additional storage, both removable and non-removable, are examples of non-transitory computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the client device 200. The client device 200 may also contain communications connections 224 that allow the client device 200 to communicate with a stored database, another computing device or server, user terminals, and/or other devices on the network 208. The client device 200 may also include input/output (I/O) device(s) and/or ports 226, such as for enabling connection with a keyboard, a mouse, a pen, a voice input device, a touch input device, a display, speakers, a printer, etc.

In some embodiments, the client device 200 may be in communication with one or more additional electronic devices to perform at least a portion of the functionality described herein. For example, the client device 200 may be in communication with a remote application server 228 via a network connection 230.

In some embodiments, a remote application server 228 may be any computing device that provides backend support for at least one application executing on the client device 200. For example, a portion of the functionality attributed to the mobile application 212 may be performed on the remote application server 228. In some embodiments, one or more of the sensitivity data 220 or the event data 222 stored in memory 202 may be updated by the remote application server 228 (e.g., via a software update).

The network 230 may be any suitable communication network or combination of networks. Suitable communications networks may include any one or a combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

Figure 3:
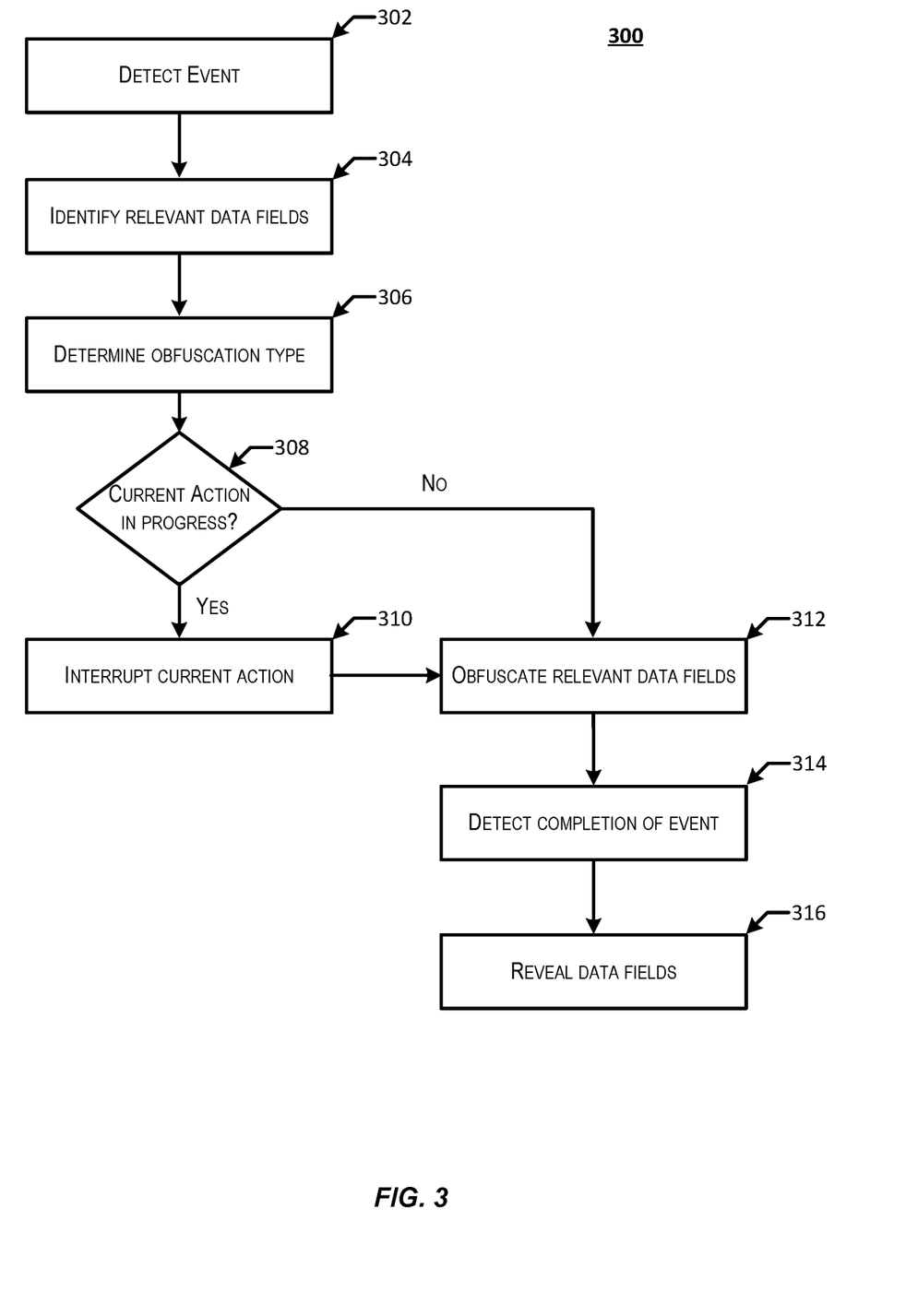
FIG. 3 depicts a flow chart illustrating an example process for obfuscating data fields in accordance with at least some embodiments.

FIG. 3 depicts a flow chart illustrating an example process for obfuscating data fields in accordance with at least some embodiments. In some embodiments, the process 300 depicted in FIG. 3 may be performed by a client device such as client device 200 of FIG. 2. In particular, the process 300 may be performed by an obfuscation module such as the obfuscation module 216 depicted in FIG. 2.

The process 300 may begin at 302, when a data capture event (e.g., a screen capture event) is detected. In some embodiments, the event may be detected via an event listener and reported to an obfuscation module. In some embodiments, the event may be identified as a data capture event based on it matching an event type indicated as being a data capture event in a list referenced by the event listener.

At 304, the process 300 may involve identifying a number of relevant data fields (i.e., data fields populated with sensitive data). In some embodiments, relevant data fields may be determined based on data field sensitivity information stored on the client device. In some embodiments, each data field may be associated with a particular level of sensitivity, such that different data fields may be determined to be relevant to different types of data capturing events. In some embodiments, only the data fields that are populated with sensitive information and displayed on the display may be determined to be relevant.

At 306, the process may involve determining, for each of the identified relevant data fields, an appropriate form of obfuscation to be applied to that data field. In some cases, it may be appropriate to nullify or remove data from the data field. In another example, an obstruction layer may be generated that is of an appropriate size to conceal data within a particular data field. In this example, the obstruction layer may be placed so that it obstructs a view of the sensitive data in the data field.

At 308, the process may determine whether a data input action is currently being taken with respect to the mobile application running on the client device. If a data input action is currently underway, that action may be interrupted at 310 in order to provide the obfuscation functionality described herein. By way of example, at the time that a data capture event is detected, a user may be entering data into a data field via a touch/keystroke event. In this example, the touch/keystroke event may be canceled, resulting in a nullification of the data entered into the data field via the touch/keystroke event. In some embodiments, further user input actions may be prevented until completion of the data capture event. For example, touch actions may be disabled and/or data fields may be locked to prevent further sensitive data from being provided.

At 312, the process may involve obfuscating the identified relevant data fields. In some embodiments, this may involve obfuscating any of the identified relevant data fields which are currently displayed on the display device. In some embodiments, this may involve determining which data fields are populated with data which is currently depicted on the screen of the display and in what location that data is depicted. For example, not all data presented within a GUI may be present on the screen. In some cases, a user may need to scroll, or otherwise select a new position within, the GUI to see certain data fields. Accordingly, the process may involve determining which data fields will be impacted by the data capture event and obfuscating those data fields. In some embodiments, this may involve displaying a number of obstruction layers in front of, or over, each relevant data field. Each of the obstruction layers may be configured to maintain their position over their respective data fields. For example, each obstruction layer may move with the data field if the GUI is scrolled. Hence, in the event that the data capture event is a video recording event, sensitive data in the data fields will continue to be obfuscated even as the user scrolls through the GUI.

At 314, the process 300 may involve detecting a conclusion of the data capture event. In some embodiments, this may involve determining that the data capture has been completed. In some embodiments, this may involve determining that an executable program responsible for capturing the data is no longer being executed. In some embodiments, once the data capture event is determined to be concluded, the process may involve revealing data within the previously-obfuscated data fields at 316. In some embodiments, this may involve removing any previously-placed obstruction layers. In some embodiments, any data fields that have been locked from further user input may be unlocked so that a user is able to enter data into those data fields.

It should be noted that while the process 300 may be performed upon detection of a data capture event that is executed during execution of a mobile application that includes sensitive data, the process 300 may be performed upon initiating execution of the mobile application. For example, upon execution of the mobile application, and prior to displaying data field values, the event listener may detect an ongoing data capture event. By way of illustration, the event listener may detect that a mirroring application (i.e., a data capturing application) is being executed in the background of the client device. Upon detecting the execution of the mirroring application in the background of the client device, the process 300 may be implemented to obfuscate any sensitive data before it is displayed on the client device.

Figure 4:
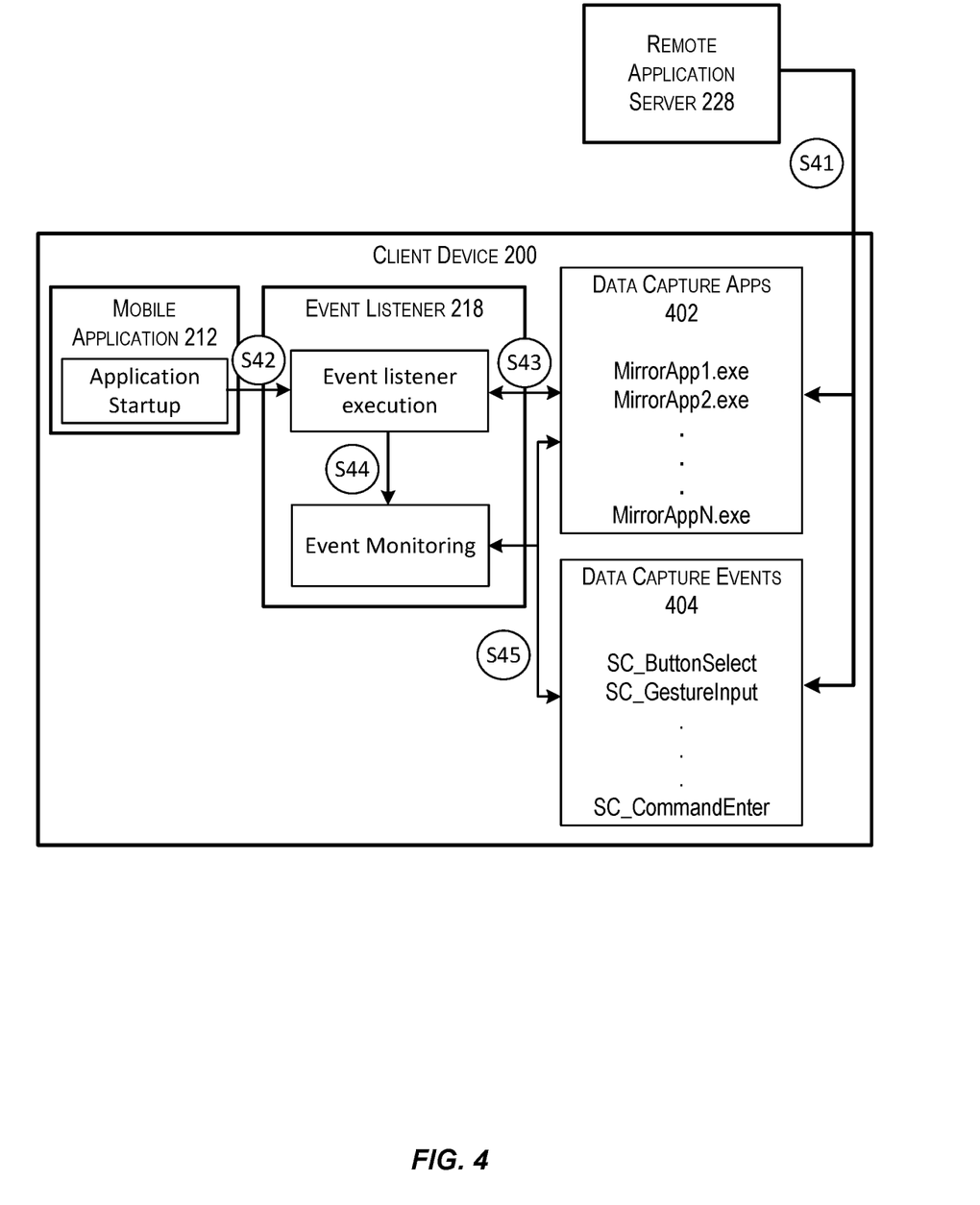
FIG. 4 depicts an illustrative example of a process that may be performed by an event listener in accordance with at least some embodiments.

FIG. 4 depicts an illustrative example of a process that may be performed by an event listener in accordance with at least some embodiments. In some embodiments, a client device 200 that includes the event listener 218 and mobile application 212 may be in communication with a remote application server 228. Each of these components may be examples of the corresponding components described with respect to FIG. 2 above. It should be noted that, as pointed out elsewhere, the event listener 218 may be included in a mobile application 212 or it may be separate from the mobile application 212. In some embodiments, an event listener 218 may be common to a number of mobile applications 212, in that the event listener 218 may report events to any mobile application that is currently being executed.

In some embodiments, the client device 200 may store an indication of a number of different types of data capture events (e.g., within an event database 222). For example, the client device 200 may store an indication of data capture applications 402 as well as an indication of data capture events 404. In some embodiments, these indications may be stored as a "blacklist" or "whitelist," which include identifiers that can be used to determine whether a detected event is a data capture event. For example, a table of data capture applications 402 may include a name of a file that is executed upon initiation of a particular data capture application (e.g., a screen mirroring application). In some embodiments, the data stored in 402 and 404 may be updated by a remote application server 228 as the remote application server 228 becomes aware of new data capture events. For example, upon identifying a new screen capture application, the remote application server may update the data 402 to include an identifier for that new screen capture application at step S41. In this example, the updated information may be provided in any suitable manner (e.g., push notification).

At step S42, a mobile application 212 may be executed on the client device 200, which may cause the event listener 218 to be executed. In some embodiments, this may involve a user of the client device 200 selecting and opening an icon associated with the mobile application 212 on the screen of the client device. In some embodiments, the mobile application 212 may be a browser application and the event listener 218 may be an applet or other small program that is executed upon the user visiting a particular webpage.

Upon execution of the event listener 218, the event listener may, before data fields associated with the mobile application 212 are presented, determine whether a capture event is currently in progress at step S43. If a data capture event is currently in progress, then the event listener may report the data capture event to an obfuscation module as discussed elsewhere. In some embodiments, the event listener 218 may check applications running in the background of the client device 200 to determine whether a data capture application is currently running. In some cases, to do this, the event listener 218 may compare the file names of various applications running in the background of the client device 200 to file names of known data capture applications 402.

Upon determining that a capture event is not currently in progress, the event listener 218 may enter an event monitoring mode at step S44. In this event monitoring mode, the event listener 218 may detect each event as it occurs and determine whether the detected event is a data capture event. In some cases, this may involve comparing the detected event to a number of known data capture events 404 at step S45. Additionally, if the event involves the execution of a mobile application, the event listener 218 may determine whether the mobile application being executed is a data capture application from the list 402. In some embodiments, the event listener 218 may continue in the event monitoring mode until the mobile application 212 is ended.

Figure 5:
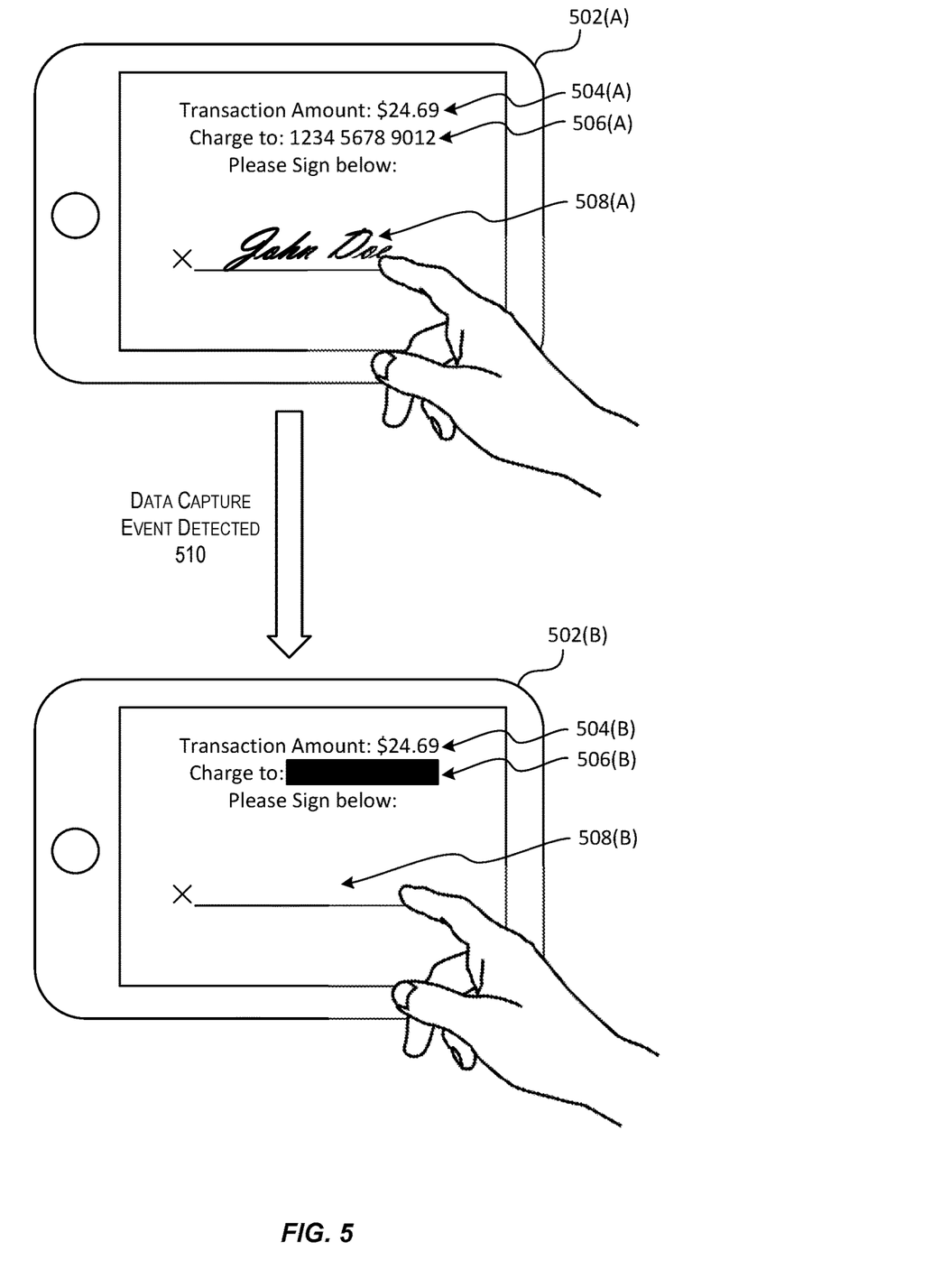
FIG. 5 depicts some exemplary data field obfuscation interactions that may occur in accordance with at least some embodiments.

FIG. 5 depicts some exemplary data field obfuscation interactions that may occur in accordance with at least some embodiments. In FIG. 5, a client device 502 is depicted both before detection of a data capture event at 502(A) and after detection, but before completion, of the data capture event at 502(B).

As depicted, the client device 502 may display, via a display screen, a graphical user interface associated with a mobile application. The mobile application may include a number of data fields 504, 506, and 508, for which a data value associated with data field may be displayed. Some of the data fields may be sensitive in nature, whereas some of the data fields may not be sensitive. For example, in the depicted illustration, a data field 504(A) associated with a transaction amount may not be determined to be sensitive, whereas a data field 506(A) associated with a primary account number (PAN), and a data field 508(A) associated with a signature block may each be determined to be sensitive. In the depicted example, only data values associated with data fields 506 and 508 (those determined to be sensitive) may be obfuscated.

As depicted at 510, a data capture event may be detected on the client device 502. Upon detection of, and prior to completion of, the data capture event at 510, data values associated with data fields determined to be sensitive may be obfuscated. In the depicted example, data fields 506(B) and 508(B) are depicted as being obfuscated using different techniques. In particular, data field 506(B) is depicted as being obfuscated by placing an obstruction layer over the data value associated with the data field 506(B). In contrast, data field 508(B), which was recording a touch event at the time that the data capture event was detected, has been nullified (e.g., the data value has been removed from the data field). As depicted with respect to data field 508, when a data capture event is detected while data is being entered using a touch event, the touch event may be canceled, causing any entered data to be removed.

It should be noted that the examples illustrated in FIG. 5 are intended to be non-limiting in nature. One skilled in the art would recognize a number of additional ways in which data may be obfuscated which may be considered equivalent to the techniques presented. Additionally, although the obstruction layer is depicted as being an opaque object, an obstruction layer may be used which is semi-transparent. For example, an obstruction layer may allow a portion of the data value to be viewed while making the data value unreadable (e.g., by distorting the data value).

Figure 6:
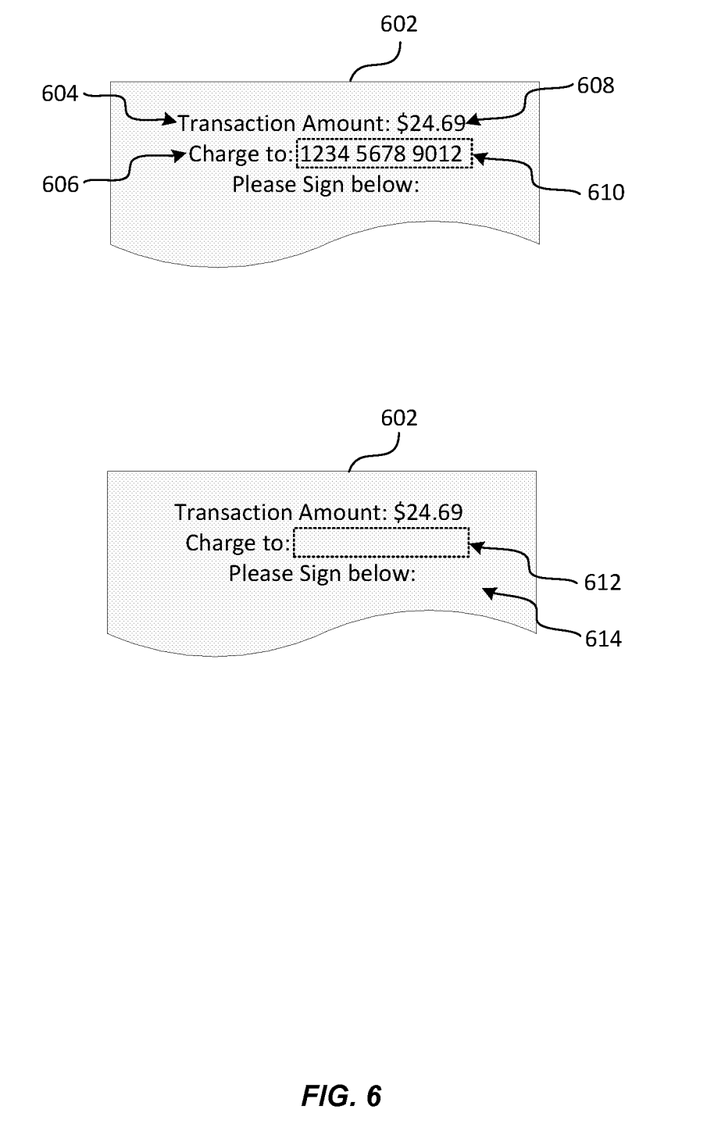
FIG. 6 depicts some exemplary features of a data field that may be used in obfuscation techniques in accordance with at least some embodiments.

FIG. 6 depicts some exemplary features of a data field that may be used in obfuscation techniques in accordance with at least some embodiments. In FIG. 6, a graphical user interface (GUI) 602 is presented with respect to a mobile application. GUI 602 includes a number of components (e.g., data fields) which are positioned according to a layout defined in a container associated with the GUI 602. It should be noted that while the data fields depicted in GUI 602 are depicted as text fields, the data fields may include any object in which data values may be stored and displayed. For example, data fields may also include buttons, image views, etc.

In some embodiments, the user interface container may be used to identify positional information for one or more objects (e.g., text objects) and corresponding data fields/data values. For example, the user interface container may include position information for text object 604 and text object 606. Additionally, the user interface container may include position information for displayed data values corresponding to data field 608 and data field 610. The user interface container may also store an indication as to whether or not a particular data field is populated with a value.

In accordance with at least some embodiments, the functionality of the container associated with the GUI 602 may be extended to include at least a portion of the functionality described herein. In particular, the container associated with the GUI 602 may be further configured to store an indication of a level of sensitivity associated with each data field. In some embodiments, the level of sensitivity may be a numeric value. In some embodiments, the level of sensitivity may be a binary value (e.g., True or False) indicating whether the data field is sensitive or not. Additionally, the container associated with the GUI 602 may be configured to draw, or render, an obstruction layer 612 over one or more data field values (e.g., upon receiving instructions from an obfuscation module).

In some embodiments, an obstruction layer 612 may be generated such that it matches its surroundings. For example, in some embodiments, a color or hue of the area 614 surrounding a data field 610 may be sampled. The obstruction layer 612 may then be generated to match the sampled color and hue of the area 614. In these embodiments, when used to obfuscate a data field, the obstructing layer 612 may cause the data field to appear unpopulated. In some embodiments, color information for a particular data field may be stored by the container associated with the GUI 602, which may be used to generate the obstructing layer 612.

Figure 7:
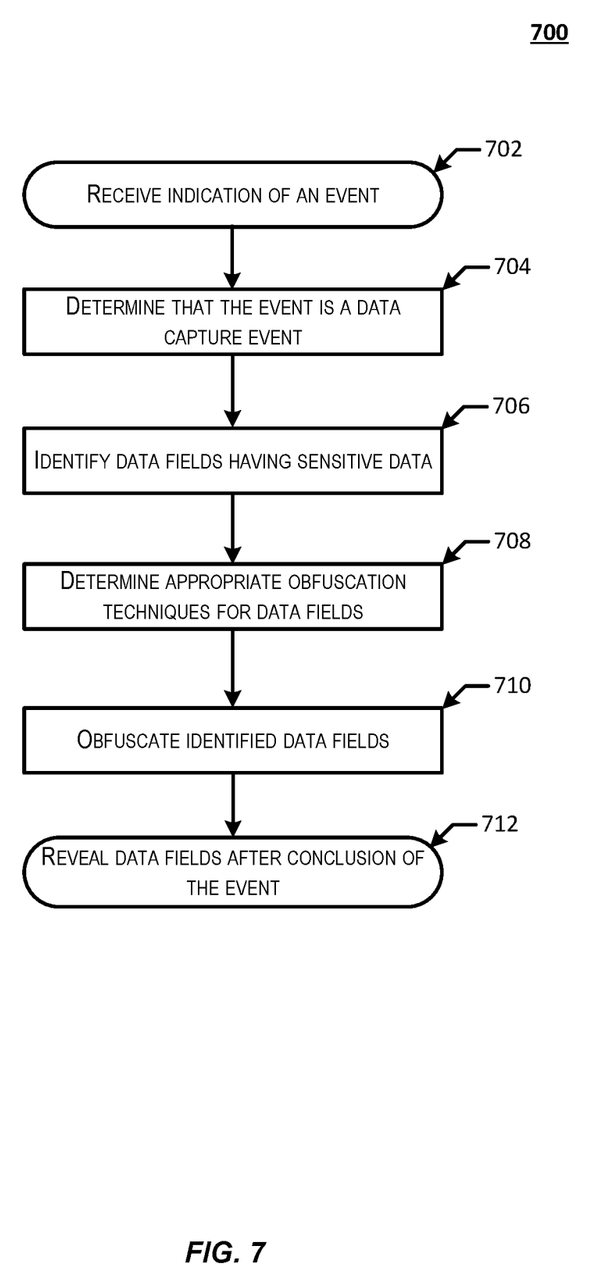
FIG. 7 depicts a flow diagram illustrating a process for protecting sensitive data from inadvertent release due to screen capture in accordance with at least some embodiments.

FIG. 7 depicts a flow diagram illustrating a process for protecting sensitive data from inadvertent release due to screen capture in accordance with at least some embodiments.

Process 700 may begin at 702, when an indication of an event is received. In some embodiments, the event may be detected by an event listener configured to receive data from an operating system of the device upon which the process 700 is being performed. As discussed elsewhere, an event may include any action or occurrence recognized by operating system which can be handled by the operating system. By way of non-limiting example, an event may include any of a touch event, a keystroke event, a gesture recognizer event, or any other action.

At 704, the process may involve determining whether or not the event is a data capture event. In some embodiments, this determination may be made based at least in part on the event being compared to a list of known data capture events. In some embodiments, the list of known data capture events may be provided by a remote application server to a device upon which the process 700 is being performed. For example, as the remote application server becomes aware of additional event types that constitute data capture events, the remote application server may provide an updated list of known data capture events to each of the client devices that it supports. In some embodiments, the updated list of known data capture events may be provided to one or more client devices via a push notification.

Upon determining that the event is a data capture event, the process may further involve canceling one or more data input actions in order to enable the data fields populated with sensitive information to be obfuscated. In some cases, this may cause any input already received with respect to the input action to be nullified. For example, if a user is currently providing, via a touch event, a signature for a signature data field when the data capture event is detected, the touch event may be canceled. In this example, the portion of the user's signature which has already been entered may not be entered into the signature data field such that the data value in that data field remains null.

At 706, the process may involve identifying data fields populated with sensitive data. In some embodiments, this may involve identifying data fields which are populated with data values, and determining a level of sensitivity associated with each of the populated data fields. Each data field may be associated with a level of sensitivity (e.g., within a database table or metadata tag). In some embodiments, the level of sensitivity may be a numeric value and the method may involve determining whether the level of sensitivity is above some threshold level of sensitivity. For example, in some embodiments, each data field may be associated with a different level of sensitivity such that it may be obfuscated for some types of data capture events but not others. In some embodiments, the level of sensitivity may be a binary value (e.g., True or False) which indicates whether or not the data field includes a sensitive data value. In some embodiments, the process may filter out, or otherwise disregard, any data values which are not currently displayed on a display screen. In some embodiments, information on whether a data value is currently displayed or not on a display screen may be provided by a user interface container.

At 708, the process may involve determining, for each of the identified data fields, an appropriate obfuscation technique. In some embodiments, it may be appropriate to remove or nullify data includes in a data field. For example, if only a portion of the data value has been entered into a data field (e.g., a data input event is still in progress), then the data value may be nullified. In some embodiments, the appropriate obfuscation technique may involve generating an obfuscation layer that will conceal a data value associated with the data field. In these embodiments, the process may also involve identifying positional information for each of the identified data fields, which may be provided by a user interface container.

At 710, the process may involve obfuscating each of the identified data fields in the determined manner. In some embodiments, this may involve generating an obstruction layer and rendering the obstruction layer so that it conceals each of the identified data fields. To generate an obstruction layer, the process may involve creating blocking objects that will be displayed at a position corresponding to each of the identified data field values. In some embodiments, obfuscating each of the identified data fields may involve nullifying at least one data value within the identified data fields.

At 712, the process may involve revealing the obfuscated data fields upon determining that the event has concluded. In some embodiments, the event may be determined to be concluded when the event listener detects a conclusion of the event or when it detects that the event is no longer present (e.g., when a data capture application is no longer being executed). In some embodiments, revealing the obfuscated data fields may involve removing the obfuscation layer concealing the data field values.

Embodiments of the system described herein result in a number of technical advantages over conventional systems. For example, the system described herein enables software developers to implement capabilities that are not typically able to be implemented in a mobile application and which provide additional protection of a user's sensitive information. The system provides an efficient technique for obfuscating sensitive data which can be performed by any mobile application that implements the system.

Furthermore, embodiments of the disclosure provide a solution to a technological challenge faced by a number of issuers and mobile application developers. Namely, embodiments of the disclosure provide the ability to prevent sensitive data from being captured, and subsequently used, by unauthorized parties. It should be noted that functionality and capabilities of client devices are often at odds with data privacy, in that the developers of such functionality are often unaware of, or unconcerned with, the use of that functionality to capture sensitive data. For example, consider a scenario in which an mPOS is used on a merchant's device to perform a transaction. Even if the merchant is a trusted entity, the operator of the client device upon which the mPOS application is being executed is not necessarily a trusted party. In this scenario, the mPOS is typically configured to capture a user's signature for authorization. To do this, the operator of the mPOS device will usually hand the mPOS device to the customer, allow the customer to sign on the display screen, and take the mPOS device back from the customer. In the above scenario with conventional systems, there is no protection for the customer from the operator of the mPOS device taking a screen capture of the customer's signature to be used later in a fraudulent transaction. In embodiments of the current disclosure, however, any attempt to capture the customer's sensitive data will fail, protecting the customer's sensitive data and providing security to that customer.

A computer system may be used to implement any of the entities or components described above. The subsystems that may be included include system bus. Additional subsystems include a printer, keyboard, storage device, and monitor, which are coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus allows the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within one or more computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of obfuscating sensitive information comprising:
   receiving, at a mobile application executed on a mobile device, an indication of an event occurring on the mobile device;
   determining, by the mobile application, that the event will result in a screen capture being performed with respect to the mobile application, wherein the event that is determined to result in the screen capture is based at least in part on the event being compared to a list of known data capture events, and wherein the list of known data capture events is provided by a remote application server;
   responsive to determining that the event will result in the screen capture, identifying, by the mobile application, a number of data fields associated with the mobile application which are populated with sensitive information and displayed on a display of the mobile device;
   responsive to identifying the number of data fields, determining, by the mobile application, a level of sensitivity associated with each of the populated data fields;
   responsive to determining the level of sensitivity of each of the populated data fields, determining, by the mobile device for each populated data field, the level of sensitivity is above a threshold level of sensitivity; and
   causing, by the mobile application, the data fields populated with sensitive information in the populated data fields with levels of sensitivity above the threshold level of sensitivity to be obfuscated at least until the event has been completed.

2. The method of claim 1, further comprising canceling one or more data input actions in order to enable the data fields populated with sensitive information to be obfuscated.

3. The method of claim 1, wherein causing the data fields populated with sensitive information to be obfuscated comprises generating at least one obstruction layer and rendering the obstruction layer so that it conceals at least one data field.

4. The method of claim 1, wherein causing the data fields populated with sensitive information to be obfuscated comprises nullifying at least one data value within at least one data field.

5. The method of claim 1, wherein the list of known data capture events is received via a push notification.

6. The method of claim 1, wherein the level of sensitivity is a binary value.

7. The method of claim 1, wherein the event occurring on the mobile device comprises one of a touch event, a keystroke event, or a gesture recognizer event.

8. The method of claim 1, wherein the indication of the event occurring on the mobile device is received from an event listener.

9. The method of claim 1, further comprising receiving, from the remote application server, an updated list including an identifier for a new screen capture event.

10. The method of claim 1, wherein the mobile application is a browser application, and wherein the indication of the event occurring on the mobile device is received from an event listener.

11. A mobile device comprising:
    a display;
    a processor; and
    a memory including instructions that, when executed with the processor, cause the mobile device to, at least:
    receive an indication of an event occurring on the mobile device;
    determine that the event will result in a screen capture being performed with respect to information presented on the display of the mobile device, wherein the event that is determined to result in the screen capture is based at least in part on the event being compared to a list of known data capture events, and wherein the list of known data capture events is provided by a remote application server;
    responsive to determining that the event will result in the screen capture, identify a number of data fields associated with the information presented on the display of the mobile device which are populated with sensitive information;
    responsive to identifying the number of data fields, determine a level of sensitivity associated with each of the populated data fields;
    responsive to determining the level of sensitivity of each of the populated data fields, for each populated data field, determine that the level of sensitivity is above a threshold level of sensitivity; and
    cause the data fields populated with sensitive information in the populated data fields with levels of sensitivity above the threshold level of sensitivity to be obfuscated at least until the event has been completed.

12. The mobile device of claim 11, wherein the instructions further cause the mobile device to reveal the data fields populated with sensitive information upon determining that the event has been completed.

13. The mobile device of claim 12, wherein revealing the data fields populated with sensitive information comprises removing an obstruction layer used to conceal the data fields.

14. The mobile device of claim 11, wherein the instructions comprise a mobile application installed upon the mobile device and wherein the number of data fields associated with the information presented on the display of the mobile device are identified based on information provided by a user interface container associated with the mobile application.

15. The mobile device of claim 14, wherein the user interface container provides position information for the number of data fields associated with the information presented on the display of the mobile device, and wherein the position information is used to cause the data fields populated with sensitive information to be obfuscated.

16. The mobile device of claim 15, wherein the user interface container provides the level of sensitivity for each data field presented on the display of the mobile device.

17. The mobile device of claim 11, wherein the event occurring on the mobile device comprises an execution of a data capture application.

18. The mobile device of claim 11, wherein the event occurring on the mobile device comprises one of a touch event, a keystroke event, or a gesture recognizer event.

19. The mobile device of claim 11, wherein causing the data fields populated with sensitive information to be obfuscated comprises generating and rendering an obstruction layer configured to conceal the data fields populated with sensitive information.

20. The mobile device of claim 19, wherein the obstruction layer is generated using color information from an area surrounding the data fields populated with sensitive information.

* * * * *